United States Patent
Ding

(10) Patent No.: US 11,861,074 B2
(45) Date of Patent: Jan. 2, 2024

(54) KEYBOARD

(71) Applicant: Xiangpeng Ding, Taiyuan (CN)

(72) Inventor: Xiangpeng Ding, Taiyuan (CN)

(*) Notice: Subject to any disclaimer, the term of this patent is extended or adjusted under 35 U.S.C. 154(b) by 3 days.

(21) Appl. No.: 17/773,069

(22) PCT Filed: Nov. 4, 2020

(86) PCT No.: PCT/CN2020/126398
§ 371 (c)(1),
(2) Date: Apr. 29, 2022

(87) PCT Pub. No.: WO2021/098507
PCT Pub. Date: May 27, 2021

(65) Prior Publication Data
US 2022/0397964 A1 Dec. 15, 2022

(30) Foreign Application Priority Data
Nov. 18, 2019 (CN) .......................... 201921991913.9

(51) Int. Cl.
*H01H 13/705* (2006.01)
*G06F 3/02* (2006.01)
*G06F 1/16* (2006.01)

(52) U.S. Cl.
CPC .......... *G06F 3/0213* (2013.01); *G06F 1/1664* (2013.01)

(58) Field of Classification Search
None
See application file for complete search history.

(56) References Cited

U.S. PATENT DOCUMENTS

2005/0258981 A1* 11/2005 Graham ................ G06F 3/0395
341/22
2018/0218859 A1* 8/2018 Ligtenberg ............ G06F 3/0414

FOREIGN PATENT DOCUMENTS

CN 100365548 C 1/2008

* cited by examiner

*Primary Examiner* — Carl Adams

(57) ABSTRACT

The present utility provides a keyboard, including a first operating area, a second primary key area, and a third shortcut module area which are provided on a keyboard carrier from the bottom up. The second primary key area is used for three rows of alphabet keys. The first operating area is used for setting of a space bar, and the bottom of the second primary key area and the left and right sides of the first operation area constitute left and right palm support positions. The third shortcut module area is divided into left and right sections corresponding to the left and right palm support positions of the first operating area, the left and right sections being provided with shortcut modules respectively. When a palm is on a palm support position, the palm can reach over the second primary key area to operate the shortcut module, the palm can reach over the second main key area to operate a shortcut module without lifting the wrist.

16 Claims, 5 Drawing Sheets

KEYBOARD

FIELD OF THE INVENTION

The present utility relates to keyboard fields, and more particularly to a keyboard that reduces a hand movement during operation.

BACKGROUND OF THE INVENTION

With the popularity of the computer, the computer has become an important productive tool, keyboard and mouse as the computer's interaction tool, directly relate to the efficiency of the computer. The traditional keyboard and mouse operation mode, and the keyboard is from left to right divided into primary key area, editing key area, and number key area, and the mouse is independently set. In one day work, office staff uses some functional areas and the mouse, needs to take hundreds times of wrist to move left and right, and right hand changes among the alphabet key area, editing key area, number key area, and the mouse, each movement distance exceeds 20 cm. The shoulder pressure is huge, and the force part is the weak side of the shoulder, which is the fundamental cause of the mouse shoulder.

Various new types of keyboards appear in the market, such as left, right partial keyboard, reducing or re-integration of a keyboard, etc., but cannot change the situation that needs the wrist to move left and right, and shoulder forces.

At the same time, in the mobile devices such as notebooks, touch panel replaces the mouse, but the touch panel operation is very uncomfortable, the wrist at least needs to move 10 cm down, which is often unable to combine with the keyboard, resulting that many people don't like it, not only add notebook operations area, but also easily touch by mistake, and the work efficiency is lowered.

SUMMARY OF THE INVENTION

The purpose of the present utility is to provide a keyboard. The wrist is not needed to lift during operation of the keyboard, and the wrist by the conventional transverse lift movement, turns to the up and down moving operations, the keyboard sets common modules that can be easily reached by hand, and the support for the palm all the way, thus fundamentally eliminates mouse shoulders, and mouse hand problems. At the same time, it also greatly enhances operational efficiency. Such keyboards can be applied to laptops, tablets, standalone keyboards, portable folding keyboards.

In order to achieve the above object, the technical solution of the present utility is:

A keyboard includes a first operating area, a second primary key area and a third shortcut module arranged on a keyboard carrier. The second primary key area is arranged on an upper portion of the first operating area and includes three rows of alphabet keys. The first operating area is arranged in a middle of a lower side of the second primary key area, configured for setting of a space bar, a bottom of the second primary key area and left and right sides of the first operating area constituting left and right palm support positions, the left and right palm support positions being configured for supporting hand. The third shortcut area is arranged on an upper portion of the second primary key area, the third shortcut area is divided into left and right sections corresponding to the left and right palm supporting positions of the first operating area, the left and right sections having shortcut number module and mouse pointer control touch panel, a bottom of the mouse pointer control touch panel spacing a bottom of the second primary key area a distance 4~8 cm.

The keyboard carrier of the first operating area, the second primary key area and the third shortcut module area are integrally formed on one piece.

The keyboard carrier of the third shortcut module area is disposed at an angle range 45°~−45° relative to a horizontal plane.

The first operating area further includes function keys; the second primary key area further includes function keys and symbol keys, the third shortcut module area further includes function keys, and direction key module composed of up, down, left and right direction keys.

The keyboard further includes a hand pallet arranged on the palm support positions, and is connected to or integrally formed with the keyboard carrier.

The keyboard carrier of the first operating area, the second primary key area and the third shortcut module is divided into separated left and right portions.

The shortcut number module includes 9-site-squared number keys, or two row-set of 0-9 number keys.

Another technical solution of the present utility is:

A keyboard includes a first operating area, a second primary key area and a third shortcut module arranged on a keyboard carrier. The second primary key area is arranged on an upper portion of the first operating area and includes three rows of alphabet keys. The first operating area is arranged in a middle of a lower side of the second primary key area, configured for setting of a space bar, a bottom of the second primary key area and left and right sides of the first operating area constituting left and right palm support positions, the left and right palm support positions being for supporting hand. The third shortcut area is arranged on an upper portion of the second primary key area, the third shortcut area is divided into left and right sections corresponding to the left and right palm supporting positions of the first operating area, the left and right sections having shortcut number module and direction key module composed of up, down, left and right direction keys, a bottom of the shortcut number module and the direction key module spacing a bottom of the second primary key area a distance 4~8 cm.

The keyboard carrier of the first operating area, the second primary key area and the third shortcut module area are integrally formed on one piece.

The keyboard carrier of the third shortcut module area is disposed at an angle range 45°~−45° relative to a horizontal plane.

The first operating area further includes function keys; the second primary key area further includes function keys and symbol keys, the third shortcut module area further includes function keys.

The keyboard further includes hand pallets arranged on the palm support positions, and are connected to or integrally formed with the keyboard carrier.

The keyboard carrier of the first operating area, the second primary key area and the third shortcut module is divided into separated left and right portions.

The shortcut number module includes 9-site-squared number keys, or two row-set of 0-9 number keys.

The utility model keyboard is by shortening the up and down width of the primary key area, and the shortcut module area and hand pallet position are set to the primary key area, so that the operator's palm can be supported on the hand pallet position and operate the keys of the shortcut module area without affecting other keys, thereby modifying the traditional transverse movement operating keyboard, to be longitudinal extension operating keyboard, thus greatly reduces the palm moving scope when using the keyboard, so that the user is more quickly operating the keyboard, improving the work efficiency and operation experience.

DETAILED DESCRIPTION OF PREFERRED EMBODIMENTS

The function keys of the present utility contain the conventional function keys, editing keys, and F1-F12 shortcut keys. The above-mentioned shortcut modules of the third shortcut module area can be arranged freely at the left or right and left and right combined portions according to need.

Embodiment 1

Figure 1:
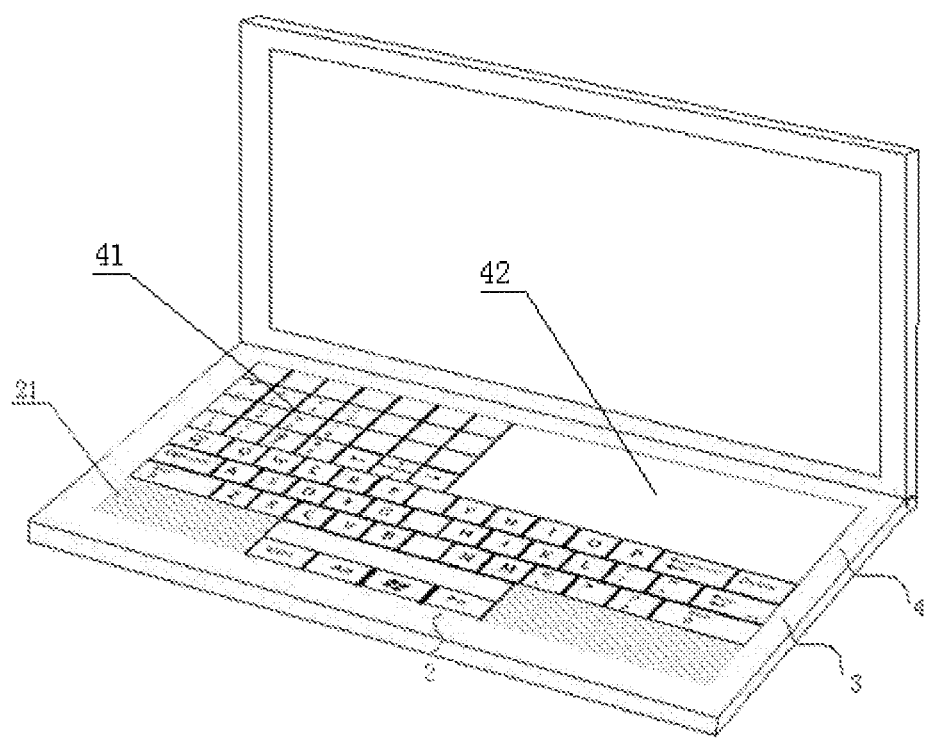
FIG. 1 is a schematic structural view of the embodiment 1 of the present utility.

Referring to FIG. 1, a keyboard of the present application is applied to a notebook. A keyboard includes a first operating area 2, a second primary key area 3, and a third shortcut module area 4 arranged on a C surface, which is a conventional keyboard surface position of a notebook.

The second primary key area 3 is located on the upper portion of the first operating area 2, includes the setting of the three rows of alphabet keys, and also includes function keys set on the left and right sides of the alphabet key rows. The second primary key area 3 is set to the three rows of alphabet keys to limit, with the upper and lower width is 5.5 cm.

The first operating area 2 is located in the middle of the lower side of the second primary key area 3, and is configured for the setting of the space bar, and further includes a function key such as ctrl, Fn, Alt, and windows key arranged at the lower side of the space bar. A bottom of the second primary key area 3 and the left and right sides of the first operating area 2 constitute the left and right palm support positions 21, the left and right palm support positions 21 are configured for supporting the hands. Since the keyboard is used on the notebook, the palm support position 21 is in an inner casing of the notebook.

The third shortcut module area 4 is located on the upper portion of the second primary key area 3, and the third shortcut module area 4 includes the left and right sections corresponding to the left and right palm support positions of the first operating area 2, with the left section provided with a 9-site-squared number module 41, the right section provided with the mouse pointer control touch panel 42. The third shortcut module area 4 further includes some commonly used function keys (symbol keys) and direction key modules. In particular, the distance between the lower edge of the mouse pointer control touch panel 42 to the bottom edge of the second primary key area 3 is about 5.5 cm. The mouse pointer control touch panel has a display function.

When the palm is on the palm support position, the thumb of the palm can correspond to operate the space bar or function key of the first operating area 2, and the four fingers except the thumb can span the shortcut module and keys of the shortcut module area through the second primary key area 3, thus enabling the operator to operate all keys and modules of the keyboard without moving or slightly up and down lifting palms, improving work efficiency.

Embodiment 2

Figure 2:
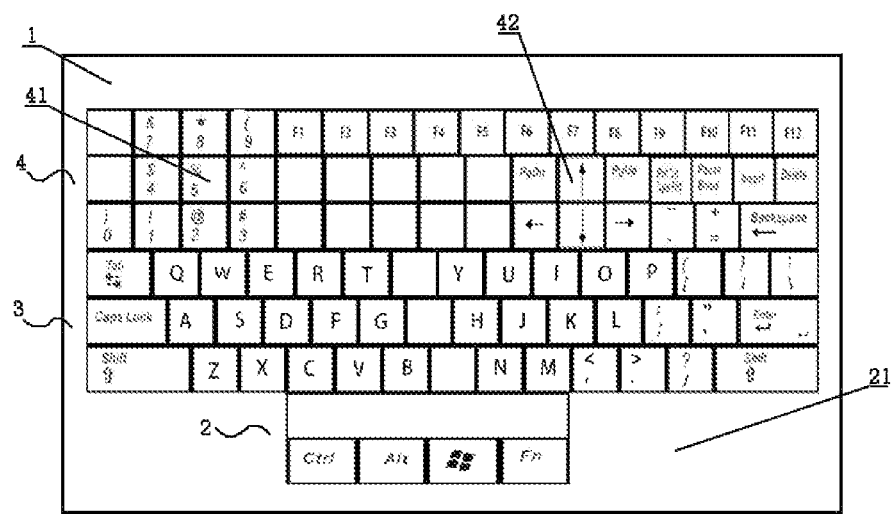
FIG. 2 is a schematic structural view of the embodiment 2 of the present utility.
Figure 5:
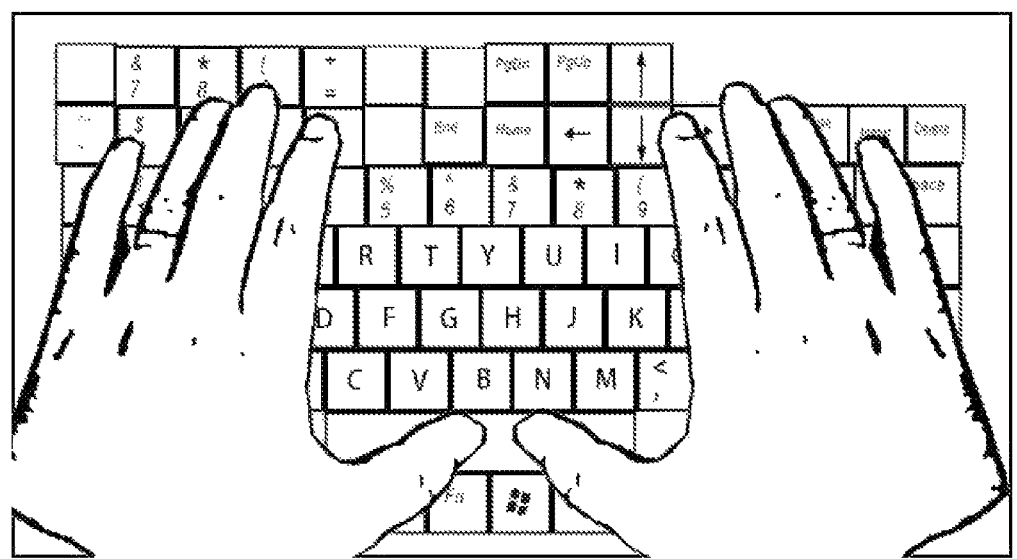
FIG. 5 shows a using state of the present utility.

As shown in FIGS. 2 and 5, a keyboard includes a first operating area 2, a second primary key area 3, a third shortcut module area 4, the first operating area 2, the second primary key area 3, and the third shortcut module area 4 are integrally formed with a keyboard carrier 1.

The second primary key area 3 is located on the upper portion of the first operating area 2, includes three rows of alphabet keys set by a conventional method, and also includes a function key and a symbol key set on the left and right side of the alphabet rows. The second primary key 3 is set three rows of alphabet keys with the upper and lower width is 6 cm.

The first operating area 2 is located in the middle of the lower side of the second primary key area 3, and configured for the setting of the space bar, The first operating area 2 further includes function keys such as ctrl, Fn, Alt, and windows keys. The bottom of the second primary key area 3 and the left and right sides of the first operating area 2 constitute the left and right palm support positions 21, and a hand pallet is attached to the palm support position 21, which may be integrally formed with the keyboard carrier, and the left and right hand pallets are used for the hands support.

The third shortcut module area 4 is located on the upper portion of the second primary key area 3, and the third shortcut module area 4 has the left and right sections corresponding to the left and right palm support positions in the first operating area 2, and the left section has a 9-site-squared number module 41 and the right section has the direction key module 42 composed of up, down, left and right direction keys. The third shortcut module area 4 further includes function keys (F1-F12, and editing keys) distributed in the shortcut module area. In particular, the 9-site-squared number module, and the direction key module bottom space the second primary key area a distance about 6 cm.

The utility model is mainly by setting the second primary key area 3 three rows of alphabet keys, shortening the upper and lower width of the primary key area, and utilizes a shorter first operating area provided in the lower portion of the second primary key area and the second primary key area to form a left right palm support position, and the third shortcut module area is arranged at the upper part of the second primary key area corresponding to the left and right palm support positions, so that when the palm is on the palm support position, the thumb of the palm can correspond to the space bar or function key of the first operating area, while the other four fingers outside the thumb can reach to operate the shortcut modules and keys of the third shortcut module, allowing the operator to reach all keys and modules to operate the keyboard without moving or slightly up and down palms, improving work efficiency.

Embodiment 3

Figure 3:
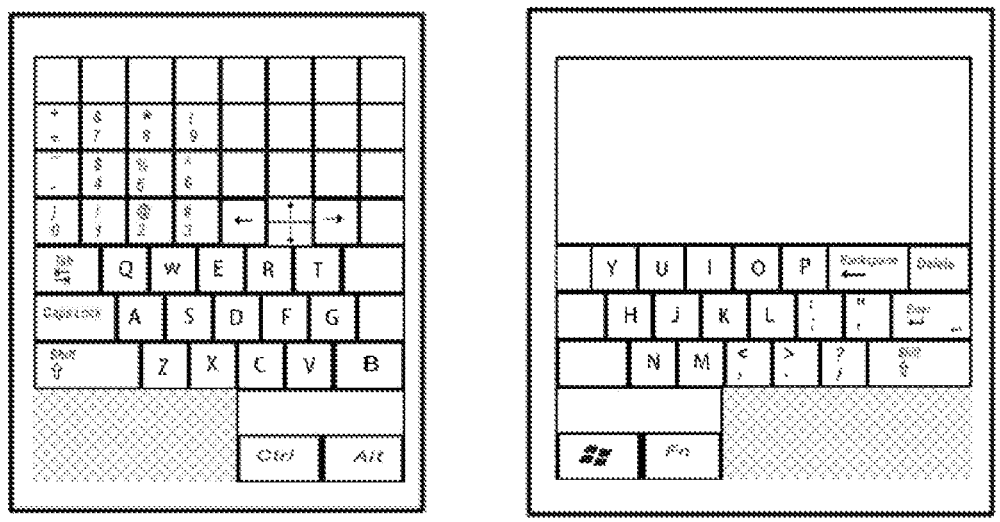
FIG. 3 is a schematic structural view of the embodiment 3 of the present utility.

As shown in FIG. 3, the keyboard carrier of the first operating area, the second primary key area, the third shortcut module area is divided into left and right portions, and the keys on the keyboard are separated to the left and right portions, respectively, and using left and right hand to operate respectively.

Embodiment 4

The keyboard carrier of the third shortcut module area is disposed at an angle relative to a horizontal plane, and the angle range is 45°~-45°, so that the operation is more conforming to the user's using habits.

Embodiment 5

Figure 4:
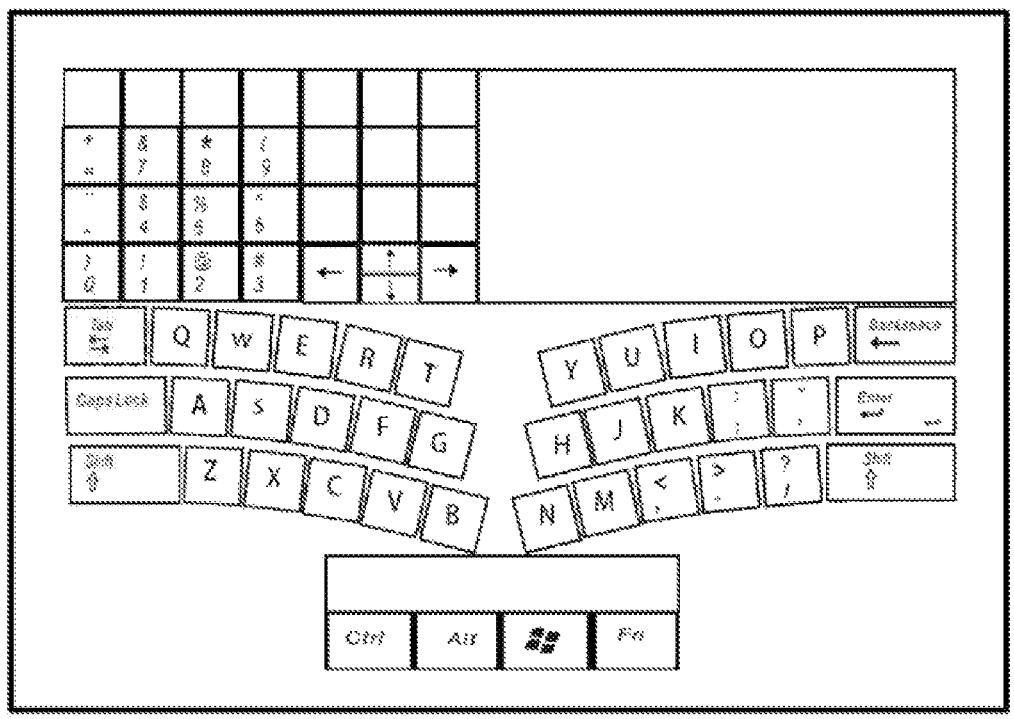
FIG. 4 is a schematic structural view of the embodiment 5 of the present utility.

As shown in FIG. 4, the three rows of alphabet keys of the second primary key area can be arranged in a conventional manner and divided into the left and right key regions in boundary of T, G, B and Y, H, N, and keys of the left and right key regions are arranged in a shape of sector, thus more in line with the principle of ergonomics, and more convenient for users.

What is claimed is:

1. A keyboard, comprising a first operating area, a second primary key area and a third shortcut area arranged on a keyboard carrier, the second primary key area being arranged at an upper portion of the first operating area and comprising three rows of alphabet keys, the first operating area being arranged at a middle of a lower side of the second primary key area, configured for setting of a space bar, a bottom of the second primary key area and left and right sides of the first operating area constituting left and right palm support positions, the left and right palm support positions being configured for supporting hands, the third shortcut area being arranged at an upper portion of the second primary key area, the third shortcut area being divided into left and right sections corresponding to the left and right palm supporting positions of the first operating area, the left and right sections having a group of shortcut numbers and a mouse pointer control touch panel, a bottom of the mouse pointer control touch panel is adjacent to a top of the second primary key area, and a spanning distance between the top and a bottom of the second primary key area is 4-8 cm in a manner that when the hands are placed on the left and right palm support positions, the thumb of the palm can correspond to operate the first operating area, and the four fingers except the thumb can correspond to operate the third shortcut area across the second primary key area.

2. The keyboard according to claim 1, wherein the mouse pointer control touch panel has a display function.

3. The keyboard according to claim 1, wherein the third shortcut area comprises a group of direction keys composed of up, down, left and right direction keys.

4. The keyboard according to claim 1, wherein the keyboard carrier of the first operating area, the second primary key area and the third shortcut area are integrally formed on one piece.

5. The keyboard according to claim 1, further comprising a hand pallet arranged on the palm support position, and is integrally formed with the keyboard carrier.

6. The keyboard according to claim 1, wherein the keyboard carrier of the first operating area, the second primary key area and the third shortcut area is divided into separated left and right portions.

7. The keyboard according to claim 1, wherein the group of shortcut numbers comprises 9-site-squared number keys, or two row-set of 0-9 number keys.

8. The keyboard according to claim 1, wherein the first operating area further comprises function keys arranged at a lower side of the space bar; the second primary key area further comprises function keys and symbol keys, the third shortcut area further comprises function keys.

9. The keyboard according to claim 1, wherein the three rows of the alphabet keys of the second primary key area are divided into a left key region and a right key region, and the keys in each of the left and right key regions arranged in a sector shape.

10. A keyboard, comprising a first operating area, a second primary key area and a third shortcut area arranged on a keyboard carrier, the second primary key area being arranged at an upper portion of the first operating area and comprising three rows of alphabet keys, the first operating area being arranged at a middle of a lower side of the second primary key area, configured for setting of a space bar, a bottom of the second primary key area and left and right sides of the first operating area constituting left and right palm support positions, the left and right palm support positions being configured for supporting hands, the third shortcut area being arranged at an upper portion of the second primary key area, the third shortcut area being divided into left and right sections corresponding to the left and right palm supporting positions of the first operating area, the left and right sections having a group of shortcut numbers and a group of direction keys composed of up, down, left and right direction keys, a bottom of the group of shortcut numbers and the group of direction keys is adjacent to a top of the second primary key area and a spanning distance between the top and a bottom of the second primary key area is 4-8 cm in a manner that when the hands are placed on the left and right palm support positions, the thumb of the palm can correspond to operate the first operating area, and the four fingers except the thumb can correspond to operate the third shortcut area across the second primary key area.

11. The keyboard according to claim 10, wherein the keyboard carrier of the first operating area, the second primary key area and the third shortcut area are integrally formed on one piece.

12. The keyboard according to claim 10, further comprising a hand pallet arranged on the palm support positions and is integrally formed with the keyboard carrier.

13. The keyboard according to claim 10, wherein the keyboard carrier of the first operating area, the second primary key area and the third shortcut area is divided into separated left and right portions.

14. The keyboard according to claim 10, wherein the group of shortcut numbers comprises 9-site-squared number keys, or two row-set of 0-9 number keys.

15. The keyboard according to claim 10, wherein the first operating area further comprises function keys arranged at a lower side of the space bar; the second primary key area further comprises function keys and symbol keys, the third shortcut area further comprises function keys.

16. The keyboard according to claim 10, wherein the three rows of the alphabet keys of the second primary key area are divided into a left key region and a right key region, and the keys in each of the left and right key regions arranged in a sector shape.

\* \* \* \* \*